Figure 1:
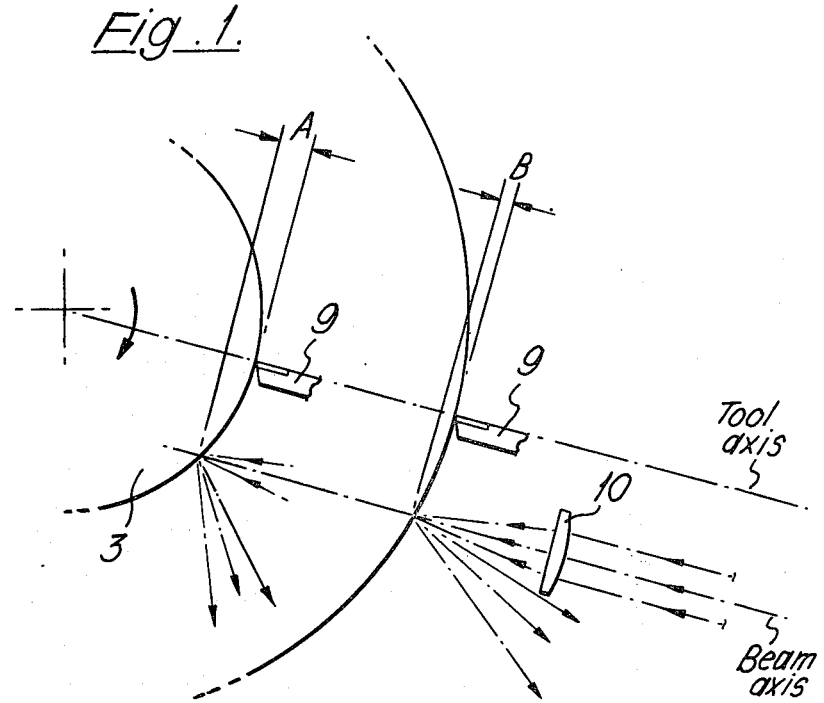

United States Patent [19]

Chase

[11] 4,352,973
[45] Oct. 5, 1982

[54] MACHINE FOR SIMULTANEOUSLY TURNING AND LASER ENGRAVING PRINTING CYLINDERS

[75] Inventor: Bryan B. Chase, Layer-de-la-Haye, England

[73] Assignee: Crosfield Electronics Limited, London, England

[21] Appl. No.: 122,893

[22] Filed: Feb. 19, 1980

[30] Foreign Application Priority Data

Feb. 23, 1979 [GB] United Kingdom .................. 7906596

[51] Int. Cl.³ .............................................. B23K 27/00
[52] U.S. Cl. ............................. 219/121 LH; 346/76 L; 369/153
[58] Field of Search .................. 219/121 LH, 121 LJ, 219/121 L, 121 LM; 346/76 L; 358/297; 369/153

[56] References Cited

U.S. PATENT DOCUMENTS 1,851,327  3/1932  Ramsey ............................... 369/132
3,474,457  10/1969  Becker .............................. 346/76 L
3,835,262  9/1974  Moritz et al. ........................ 369/153
4,074,104  2/1978  Fulkerson ....................... 219/121 LJ
4,170,726  10/1979  Okuda ............................ 219/121 LJ
4,229,640  10/1980  Longo ............................ 219/121 LJ Primary Examiner—C. L. Albritton
Attorney, Agent, or Firm—Sughrue, Mion, Zinn, Macpeak and Seas

[57] ABSTRACT

A laser engraving machine for engraving cylindrical intaglio printing members is arranged to turn the surface of a printing member and engrave it simultaneously. This is not only more efficient but ensures that an accurate relationship is maintained between the engraving head and the turned outer surface of the printing member 3. The engraving machine includes a slide-way 2 extending parallel to the axis of rotation of the printing member 3, a traversing carriage 1 mounted for movement along the slide-way 2 and having a primary sliding carriage 4 mounted on it, and the primary sliding carriage has a secondary sliding carriage 5 mounted on it. The primary and secondary sliding carriages carry a turning tool holder 8 and a laser engraving head 10.

4 Claims, 2 Drawing Figures

U.S. Patent

Oct. 5, 1982

4,352,973

MACHINE FOR SIMULTANEOUSLY TURNING AND LASER ENGRAVING PRINTING CYLINDERS

This invention relates to a laser engraving machine for engraving cylindrical intaglio printing members. Such printing members are usually formed by a cylindrical substrate covered with a plastics material. After the plastics material is placed on the cylindrical substrate, the outer surface of the printing member is skimmed on a lathe to provide a blank printing member with a surface having a high degree of accuracy and a good, smooth surface finish. It is important that the outer surface of the blank printing member is absolutely true and has a smooth surface finish since any irregularities in it appear as print defects when the member is subsequently used for printing.

The blank printing member is then transferred to an engraving machine where it is engraved with an image using a laser. The engraved printing member is used to print the required number of copies and after this, it may be re-used. The skimming operation is repeated to remove the engraved image and provide a fresh smooth surface and then this fresh surface is engraved with a further image. The only limitation on the number of re-uses of such a cylinder is the thickness of the plastics material which is applied to the cylindrical substrate.

According to this invention a laser engraving machine for engraving cylindrical intaglio printing members includes means for supporting and rotating a cylindrical printing member, a slide-way extending parallel to the axis of rotation of the printing member, and a traversing carriage mounted for movement along the slide-way and having a primary sliding carriage mounted on it for movement in a direction transverse to the slide-way, the primary carriage carrying a secondary sliding carriage mounted for movement transverse to the slide-way. The primary and the secondary sliding carriages carry a turning tool holder and a laser engraving head, the arrangement being such that, the relationship of the laser engraving head to the turning tool and hence to the turned surface of the printing member is set by movement of the second sliding carriage relative to the first. Thereafter, both the primary and second sliding carriages are moved together as a single unit to turn and engrave the printing member simultaneously on a single pass of the traversing carriage.

The laser engraving machine in accordance with this invention enables two distinct advantages to be gained. First, both the turning and engraving operations are carried out in a single pass of the traversing carriage which leads to a more efficient use of the machine and a greater output. Secondly and more importantly, it ensures that the engraving head is maintained in accurate relationship to the turned outer surface of the printing member. When the printing member has to be moved between different machines for the turning and the engraving operations, or even if the printing member could be turned and engraved in two different passes on the same machine, it is always possible for some discrepancy or variation in the alignment between the laser head and the engraved surface to occur, resulting in the laser beam not being focused correctly with respect to the surface of the printing member throughout the entire engraving operation and thereby resulting in a poor quality of engraved image being obtained. Carrying out both these operations during the same pass of the traversing carriage ensures that the relationship between the laser engraving head and the outer surface of the printing member is maintained constant throughout the engraving operation.

The turning tool holder is preferably arranged so that the axis of the turning tool is located in a diametral plane of the printing member. However, the engraving head is preferably arranged so that the axis of the engraving laser beam leaving the head is in a plane parallel to the diametral plane containing the turning tool axis but offset from that plane to such an extent that the cone of the laser beam reflected from the surface of the printing member does not impinge on optical elements of the laser engraving head. This ensures that the principal axis of the laser beam strikes the printing member in a non-normal direction so that the laser beam reflected from the surface of the printing member does not return to the laser system of engraving machine and set up unwanted oscillations in it.

The laser engraving head is arranged behind the turning tool in the direction of forward movement of the traversing head so that the laser beam is focused accurately onto the surface of the printing member which has just been turned by the turning tool mounted in the tool holder. Preferably the turning tool holder is mounted on the primary carriage and the laser engraving head is mounted on the secondary carriage, since this enables the turning tool holder to be mounted more rigidly.

Preferably the apparatus includes a microscope mounted on the secondary sliding carriage and arranged to be moved towards and away from the printing member with respect to the secondary sliding carriage and also arranged to be locked into position with respect to the secondary sliding carriage. The microscope enables an operator to view the just turned surface to set up the secondary sliding carriage at a particular distance from the surface of the printing member.

The normal sequence of operations to set up such an apparatus is to mount the printing member on the means for supporting and rotating it, focus the laser beam onto the surface of the printing member by moving the secondary sliding carriage with respect to the first sliding carriage, focus the microscope onto the surface of the printing member by moving it relative to the engraving head, and lock the microscope into position. The secondary sliding carriage is then moved away from the surface of the printing member and the primary sliding carriage is moved forward to bring the turning tool, usually a diamond tipped turning tool, into contact with the outer surface of the printing member. The tool is then used to cut a circumferential band around the printing member to a required depth, and then the secondary sliding carriage is moved towards the printing member until, when viewed through the microscope, the printing member is brought into sharp focus. Now the laser engraving head is in its correct relationship to the turning tool and therefore, from now onwards, the only item that needs to be moved is the primary carriage which is moved as a unit to vary the depth of cut to give that required to true up a new cylinder or remove any engraving from a previously used cylinder.

Locking means are preferably provided between the secondary slide and the primary slide to lock the secondary slide in position in relation to the primary slide, but this may not be necessary since there may be sufficient friction between the two slides and their adjusting mechanism to prevent any inadvertent relative movement.

Naturally the machine has to be set up afresh when a printing member of different diameter is fitted to it since, as the turning tool and the laser engraving head are offset from one another in a direction perpendicular to the diametral plane, their separation in the diametral plane has to vary with the diameter of the printing member. Provided that the apparatus is arranged so that the turning tool and the laser engraving head are offset in a direction perpendicular to the diametral plane to a sufficient extent for the largest diameter of printing member to be turned and engraved, the offset does not need to be varied for printing members of smaller diameter. Thus, the provision of the adjustment of the secondary sliding carriage relative to the primary sliding carriage enables the apparatus to be used with printing cylinders having different diameters. In general, the smaller the diameter of the printing member the greater the separation of the point of the turning tool and the focus of the laser engraving head in the direction of the diametral plane to accommodate for the offset between the turning tool and the engraving head.

Figure 2:
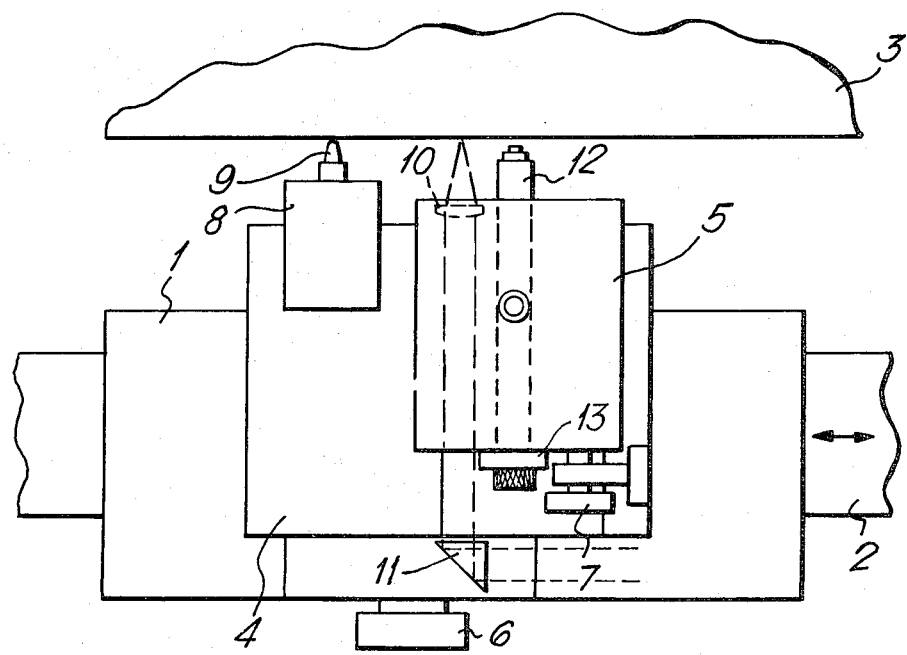

A particular example of a machine in accordance with this invention will now be described with reference to the accompanying drawings, in which:

FIG. 1 is a schematic side elevation of part of the machine showing the relationship of the turning tool and engraving head for different sizes of printing member; and, FIG. 2 is a plan of part of the machine showing the relationship of the turning tool, the primary and secondary sliding carriages and the traversing carriage.

This example of engraving machine includes a traversing carriage 1 arranged for movement along a slide-way 2 in a direction parallel to the axis of rotation of a cylindrical printing member 3. The traversing carriage 1 carries a primary sliding carrige 4 and a secondary sliding carriage 5. The primary sliding carriage 4 is mounted on the traversing carriage and arranged to be moved in a direction transverse to the slide-way 2 by a hand wheel 6. The secondary sliding carriage 5 is mounted on the primary sliding carriage 4 and is also arranged to be moved in a direction transverse to the slide-way 2, the movement of the secondary sliding carriage 5 being controlled by a hand wheel 7. The primary sliding carriage 4 carries a tool post 8, having a diamond tipped turning tool 9 mounted in it. The secondary sliding carriage 5 carries a laser engraving head represented diagrammatically by a lens 10. A prism 11 which feeds the laser beam to the head is mounted on the traversing carriage 1.

The construction of the remainder of the engraving machine including the means for mounting and driving the cylindrical printing member and the means for moving the traversing carriage 1 along the slide-way 2 are entirely conventional in their construction, as is the optical arrangement of the laser engraving head. The mounting arrangement between the primary and secondary sliding carriages and between the primary sliding carriage and the traversing carriage is also conventional in construction and similar to that used on a machine tool such as a lathe.

A fixed focal length microscope 12 is mounted on the secondary sliding carriage 5 by means of an external screwthread. Thus, as the microscope 12 is rotated it moves bodily in a direction transverse to the slide-way 2. A locking nut 13 is provided to lock the microscope into an exact position with respect to the secondary sliding carriage 5. The tool post 8 is arranged so that the turning tool 9 is located in a diametral plane as shown in FIG. 1, whereas the laser engraving head and the microscope mounted on the secondary sliding carriage 5 are arranged so that they lie in a plane which is parallel to the diametral plane containing the turning tool but offset in a direction perpendicular to the diametral plane. When the laser engraving head is arranged in this way, the principal axis of the laser beam is non-normal to the surface of the cylindrical printing member 3. The laser engraving head is offset from the diametral plane to such an extent that the cone of light reflected from the surface of the printing member 3 does not impinge upon the final lens 10 of the laser engraving head. Although the printing member 3 has a cylindrical outer surface the angle of the cone of light reflected from its surface is not really any greater than that incident upon it as the diameter of the laser spot is so small, only of the order of a few microns, and therefore the increase in its cone angle on reflection may be ignored. However, the light is reflected at a greater angle with a smaller diameter printing member and therefore we have found that provided there is sufficient offset between the laser engraving head and the diametral plane containing the turning tool for the largest diameter of printing member to be turned and engraved, the offset does not need to be varied for printing members having a smaller diameter. This is also illustrated in FIG. 1.

To use the engraving machine, the laser engraving head is initially focused onto the surface of the cylindrical printing member 3 by movement of the hand wheel 7 to move the secondary sliding carriage 5. The microscope 12 is then focused until the surface of the printing member 3 appears in sharp focus and the locking screw 13 tightened to fix the microscope so that its focal plane is co-planar with that of the laser engraving head. The second sliding carriage 5 is then moved away from the printing member 3 using the hand wheel 7. The printing member 3 is driven and the hand wheel 6 operated to move the primary sliding carriage 4 toward the printing member 3 until the turning tool 9 contacts the outer surface of the printing member and cuts a circumferential band around the outer surface of the printing member. The traversing carriage 1 is then moved along the slide-way 2 until the circumferential band can be inspected by being viewed through the microscope 12. The hand wheel 7 is then moved until the surface cut by the tool 9 is brought into sharp focus. Now, the tip of the turning tool 9, the focus of the laser beam from the laser engraving head, and the focus of the microscope 12 all lie on the same cylindrical surface.

The traversing carriage 1 is then moved to the end of the printing member 3 and the hand wheel 6 used to move the primary carriage 4 and the secondary carriage 5 together as a unit until the required depth of cut of the turning tool 9 has been set, and the engraving machine is then set to operate with the traversing carriage being moved along the slide-way 2. In a single pass of the traversing carriage 1, the turning tool 9 skims the outer surface of the printing member 3 and an image is engraved on the just turned surface with the laser engraving head 10.

The relative positions of the primary and secondary sliding carriages 4 and 5 has to be set up afresh for different diameters of printing member 3 since, as shown in FIG. 1, the distance between the tip of the turning tool 9 and the focal point of the laser engraving head varies in the direction of the diametral plane containing the turning tool depending upon the diameter of the printing member. Their separation A when the diameter of the printing member 3 is small is much greater than their separation B when the diameter of the printing member 3 is greater.

I claim:

1. In a laser engraving machine for engraving cylindrical intaglio printing members including means for supporting and rotating a cylindrical printing member, a slide-way extending parallel to the axis of rotation of said printing member, a traversing carriage mounted for movement along said slide-way, and a primary sliding carriage mounted on said traversing carriage for movement in a direction transverse to said slide-way, said primary carriage carrying a laser engraving head, the improvement wherein a secondary sliding carriage is mounted on said primary sliding carriage for movement transverse to said slide-way, and wherein said primary and said secondary sliding carriages carry a turning tool holder and said laser engraving head whereby the relationship of said laser engraving head to said turning tool holder and hence to a turned surface of said printing member is set by movement of said secondary sliding carriage relative to said primary sliding carriage and then, thereafter, both said primary and said secondary sliding carriages are moved together as a single unit to turn and engrave said printing member simultaneously on a single pass of said traversing carriage.

2. The engraving machine of claim 1, wherein said turning tool holder is arranged whereby the axis of said turning tool is located in a diametral plane of said printing member.

3. The engraving machine of claim 2, wherein said engraving head is arranged whereby the axis of a laser beam leaving said engraving head is in a plane parallel to said diametral plane containing said turning tool axis but offset from that said plane.

4. The engraving machine of claim 1 or claim 3, wherein said machine additionally includes a microscope mounted on said secondary sliding carriage and arranged to be moved towards and away from said printing member with respect to said secondary sliding carriage, said microscope also being arranged to be locked into position with respect to said secondary sliding carriage.

* * * * *